United States Patent [19]

Tankersley et al.

[11] Patent Number: 5,403,244
[45] Date of Patent: Apr. 4, 1995

[54] ELECTRIC VEHICLE DRIVE TRAIN WITH DIRECT COUPLING TRANSMISSION

[75] Inventors: Jerome B. Tankersley, Fredericksburg; Richard W. Boothe; Charles E. Konrad, both of Roanoke, all of Va.

[73] Assignee: General Electric Company, Fairfield, Conn.

[21] Appl. No.: 16,798

[22] Filed: Apr. 15, 1993

[51] Int. Cl.⁶ ............................................. F16H 61/04
[52] U.S. Cl. .................................... 477/20; 180/65.3
[58] Field of Search ............... 477/20; 180/65.3, 65.8; 475/153

[56] References Cited

U.S. PATENT DOCUMENTS

| | | | |
|---|---|---|---|
| 3,566,717 | 3/1971 | Berman et al. | 74/859 |
| 3,984,742 | 10/1976 | Bader | 318/338 |
| 4,021,712 | 5/1977 | Ishihara et al. | 318/432 |
| 4,096,418 | 6/1978 | Marumoto et al. | 318/12 |
| 4,174,645 | 11/1979 | Ohmae et al. | 74/866 |
| 4,233,858 | 11/1980 | Rowlett | 74/675 |
| 4,351,405 | 9/1982 | Fields et al. | 180/65 A |
| 4,597,463 | 7/1986 | Barnard | 180/165 |
| 4,799,564 | 1/1989 | Iijima et al. | 180/65.5 |
| 4,913,258 | 4/1990 | Sakurai et al. | 180/242 |
| 4,928,227 | 5/1990 | Burba et al. | 364/424.01 |
| 5,287,772 | 2/1994 | Aoki et al. | 74/846 |

OTHER PUBLICATIONS

MacCready, "Perspective on Vehicle Energy Efficiency and Electric Vehicles", ESD Technology, pp. 7–11, Nov. 1992.
Martin, "Propulsion Technology—Motor Selection Criteria", ESD Technology, pp. 15–17, Nov. 1992.

Primary Examiner—Dirk Wright
Attorney, Agent, or Firm—Bell, Seltzer, Park & Gibson

[57] ABSTRACT

An electric vehicle drive train includes an electric motor and an associated speed sensor, a transmission operable in a speed reduction mode or a direct coupled mode, and a controller responsive to the speed sensor for operating the transmission in the speed reduction mode when the motor is below a predetermined value, and for operating the motor in the direct coupled mode when the motor speed is above a predetermined value. The controller reduces the speed of the motor, such as by regeneratively braking the motor, when changing from the speed reduction mode to the direct coupled mode. The motor speed may be increased when changing from the direct coupled mode to the speed reduction mode. The transmission is preferably a single stage planetary gearbox.

22 Claims, 5 Drawing Sheets

ELECTRIC VEHICLE DRIVE TRAIN WITH DIRECT COUPLING TRANSMISSION

Government Rights

The Government of the United States of America has rights in this invention pursuant to Contract No. DE-AC07-90ID13019 (Subcontract No. 47-2-111883) awarded by the U.S. Department of Energy.

FIELD OF THE INVENTION

The invention relates to the field of electric vehicles, and more particularly, to a drive train for an electric vehicle for providing enhanced efficiency for the vehicle.

Background of the Invention

Electric vehicles are receiving considerable attention as a substitute for present gasoline-fueled vehicles. This interest is based primarily on zero atmospheric emissions obtainable from an all-electric vehicle. Electric vehicles offer other advantages including the ability to reduce United States dependency on imported oil, since much of the U.S. electric utility industry uses coal, nuclear, gas or hydroelectric energy supplies.

Even hybrid electric vehicles incorporating a small gasoline engine running at constant speed to recharge an electric traction battery offer anticipated lower emissions. See, for example, U.S. Pat. No. 4,351,405 to Fields et al. which discloses a hybrid vehicle including a gasoline engine for driving the front wheels during high speed and long distance travel, while the rear wheels are connected to electric motors for low speed and stop-and-go driving.

Unfortunately, for an all-electric vehicle in particular, present battery technology does not permit storage of sufficient amount of electrical energy to provide a cruising range comparable to a typical gasoline-fueled vehicle. Accordingly, improvements have been made to increase the energy consumption efficiency of an electric vehicle. For example, body aerodynamics, tires, bearings, and vehicle accessories have been improved as described, for example, in *Perspectives on Vehicle Energy Efficiency and Electric Vehicles,* by MacCready, appearing in ESD Technology, pp. 7–11 (Nov. 1992).

Typical electric vehicles have been proposed including transmissions to couple one or more electric motors to the driven vehicle wheels. Where a single motor is used, such as to drive both front wheels of the vehicle, a differential is typically used. An alternate approach to a conventional gear reduction transmission is using respective individual motors to directly drive the vehicle wheels as is disclosed in U.S. Pat. No. 4,913,258 to Sakurai et al. and entitled *Electric Vehicle.* Unfortunately, individual motors for each wheel increases the cost, complexity, and weight of the vehicle, and the performance of the vehicle may also be compromised.

Motor selection for an electric vehicle also plays an important role in optimizing the performance and cruising range of an electric vehicle. As disclosed in an article entitled *Propulsion Technology—Motor Selection Criteria,* by Martin, appearing in ESD Technology, pp. 15–17, various motor types are available. In particular, the induction motor offers a number of advantages including a peak efficiency of 94–95% and with a relatively high efficiency at 10% load of about 93–94%. Since a typical passenger vehicle requires only a relatively small amount of power at cruising speeds, a high motor efficiency at low load demand is critical in enhancing the cruising range of the electric vehicle.

Reducing the size and weight of the electric motor also enhance the vehicle's cruising range and performance. Accordingly, a motor, such as an induction motor, is typically selected to run at high RPM's to thereby deliver a high output power with a relatively small and lightweight construction. An induction motor, for example, may readily be designed to operate at a maximum RPM in the range of about 9,000 to 15,000 RPM. Accordingly, the wheels of the vehicle cannot be driven directly from the output shaft of such a motor; rather, some type of gear reduction is typically needed. The gear reduction also permits delivery of higher torque needed during starting and acceleration. Unfortunately, even highly efficient gear reduction trains cause efficiency losses which serve to significantly reduce the cruising range of an electric vehicle.

More importantly, a typical gear reduction train imposes an efficiency loss that is approximately a fixed percentage of its full load capability in a light torque, high-speed operating condition. Since a vehicle at cruising speed on a level surface requires only a small portion of its full power capability, a typical gear reduction transmission consumes a large portion of the power being delivered to drive the vehicle. This efficiency may be as low as 60–70% during such cruising conditions. For example, a vehicle cruising at 60 mph on level terrain may need only about 7 HP. Even a highly efficient gear train may consume an additional 1.5 HP. Accordingly, the vehicle's range is reduced by about 20%.

SUMMARY OF THE INVENTION

In view of the foregoing background, it is therefore an object of the present invention to provide an electric vehicle drive train and associated method providing higher efficiency, especially when cruising at light load demand and at high speed.

It is another object of the present invention to provide an electric vehicle drive train having acceptable performance characteristics in terms of starting torque and/or acceleration, while also having a relatively long cruising range.

These and other objects, features, and advantages of the present invention are provided by an electric vehicle drive train including an electric motor, a sensor for sensing the rotational speed of the motor, transmission means for rotatably driving one or more wheels of the vehicle in one of a speed reduction mode or and direct coupled mode, and control means for operating the transmission means in the direct coupled mode when the sensed motor speed is above a predetermined value.

The direct coupled mode of operation couples the output shaft of the electric motor to rotate an output shaft of the transmission means at the same rotational speed and, accordingly, without the substantial efficiency losses associated with conventional speed reduction gearing when operated under light-load, high-speed conditions. As would readily be understood by those skilled in the art, a single motor may preferably drive the transmission means, which, in turn, is connected to a pair of driven wheels through a differential.

The electric vehicle incorporating the drive train of the present invention enjoys increased efficiency at highway cruising speeds, for example, because the direct coupling bypasses the losses caused by speed reduction gearing in the transmission means. The increased efficiency may, in turn, increase the vehicle's range for a given battery capacity. Moreover, acceptable low speed performance of the electric vehicle is also maintained because the control means also operates the transmission means in the speed reduction mode when the sensed motor speed is below a predetermined value. The speed reduction mode permits the motor to operate at high rotational speeds and thereby permits usage of a smaller and lighter motor, while still producing sufficient power and torque for starting and acceleration.

The control means preferably includes speed synchronizing means connected to the electric motor for reducing the rotational speed of the motor to substantially match to the transmission means when changing from the speed reduction mode to the direct coupled mode. The term "substantially match" is meant to cover a range from the identical speed to a slight speed mismatch, such as to facilitate meshing of gears, for example, as would be readily appreciated by those skilled in the art. Since a typical electric vehicle includes regenerative braking, the control means may operate the motor in a regenerative braking mode to slow the motor to the desired speed of the transmission means.

The transmission means also preferably includes freewheeling means for decoupling an output shaft of the motor from the output shaft of the transmission means. The control means preferably includes means cooperating with the freewheeling means to decouple the motor and transmission means momentarily to facilitate changing the motor speed when the transmission means is changed between the speed reduction mode and the direct coupled mode. Thus, a smooth change is performed between the speed reduction mode and the direct coupled mode. In addition, the speed synchronizing means may also include means for increasing the speed of the motor when changing from the direct coupled mode to the gear reduction mode to also provide smoother and more transparent operation of the drive train to the vehicle occupants. When increasing the motor speed, the motor output shaft is preferably momentarily decoupled from the transmission means output shaft.

The transmission means is preferably provided by a single stage planetary gearbox. As would be readily understood by those skilled in the art, the planetary gearbox preferably includes a housing, a releasably lockable ring gear positioned within the housing, a plurality of planet gears and an associated planetary carrier positioned within the housing, and a sun gear cooperating with the planet gears. The sun gear is preferably connected to the motor output shaft and the planetary carrier is connected to the transmission means output shaft when the transmission means is in the gear reduction mode. The gearbox also preferably has a reduction ratio in the range of about 5:1 to 15:1, and, more preferably about 10:1 for a typical induction motor operable at speeds up to 9,000 to 15,000 RPM.

The single stage planetary gearbox also preferably includes means for direct coupling the motor output shaft to the gearbox output shaft when the transmission means is in the direct coupled mode. For the direct coupled mode, the ring gear may be released from the housing and the motor shaft directly connected to the output shaft of the gearbox. Thus, the efficiency losses associated with the gear reduction train are eliminated except for a small windage loss.

Another aspect of the present invention is the ability of the driver of the vehicle to manually select a desired mode of operation for the vehicle similar to the selection of a overdrive in a conventional gasoline-fueled vehicle. In other words, the drive train preferably includes selector means, such as similar to a conventional "PRNDD$_{overdrive}$" selector. Accordingly, when the "D" position is selected, for example, the control means allows the transmission means to operate only in the gear reduction mode irrespective of motor speed. Thus, greater torque is available from the motor, such as for passing or for driving along mountainous terrain. When the "D$_{overdrive}$" position is selected, the control means shifts between the gear reduction mode and the direct coupled mode as described above. Thus, the drive train of the present invention may closely mimic the operation of a conventional gasoline-fueled vehicle and thereby achieve greater driver acceptance.

A method according to the present invention includes the steps of sensing rotational speed of the electric motor, and operating the transmission in the gear reduction mode when a sensed rotational speed of the electric motor is below a first predetermined value and operating the transmission in the direct coupled mode when a sensed rotational speed of the electric motor is above a second predetermined value. As would be readily understood by those skilled in the art, the first and second predetermined values for changing operating modes may be different in order to thereby build hysteresis into the control to thereby prevent the transmission from rapidly changing between modes when the vehicle is operating near the predetermined values.

As discussed above, when changing from the speed reduction mode to the direct coupled mode, the speed of the motor may be reduced to substantially match to the transmission. The reduction in motor speed is preferably attained by operating the motor in a regenerative braking mode. The motor may also be increased in speed to match the transmission when changing from the direct coupled mode to the speed reduction mode.

BRIEF DESCRIPTION OF THE INVENTION

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
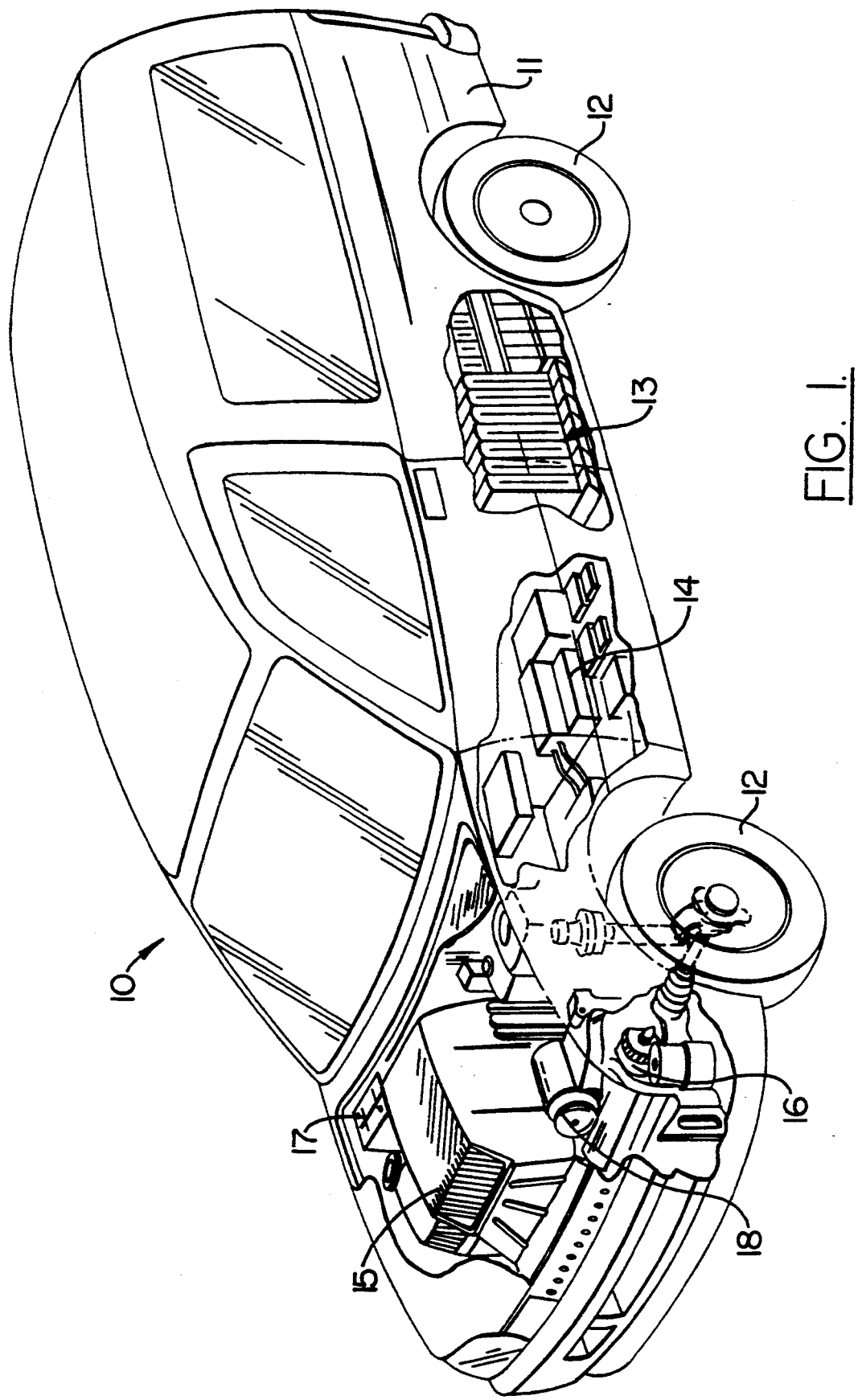
FIG. 1 is a schematic perspective view of an electric vehicle according to the present invention.

Referring first to FIG. 1 the drive train and its associated components according to the invention are illustrated installed in an electric vehicle The vehicle 10 includes a body 11 that may be carried by a separate supporting frame, or the vehicle may be of unibody construction thereby having a body with an integral frame, as would be readily understood by those skilled in the art. The vehicle's wheels 12 are rotatably mounted to the frame. As would also be readily understood by those skilled in the art, in addition to applicability to an all-electric vehicle as described herein, the drive train according to the present invention may also have applicability to hybrid types of electric vehicles which include an additional power source, such as an internal combustion engine.

A traction battery 13 is carried by the frame of the vehicle 10 in a lower medial and rearward portion to thus provide a lower center of gravity and more even weight distribution between the front and rear wheels. As would be readily appreciated by those skilled in the art, the traction battery 13 preferably comprises a plurality of rechargeable interconnected battery cells.

The vehicle 10 preferably includes a Vehicle Control Unit (VCU) 14 which, among other tasks, determines and sends a desired torque request signal to a control computer for a DC-to-AC inverter. Both the DC-to-AC inverter and its control computer are enclosed within a protective housing 15 under the hood of the vehicle. The desired torque request signal is processed by the control computer for the DC-to-AC inverter to drive the electric motor 16 to the desired torque output. The vehicle 10 may also preferably include other related components, such as a twelve volt accessory battery 17 and an electrically-powered air conditioning compressor 18.

Figure 2:
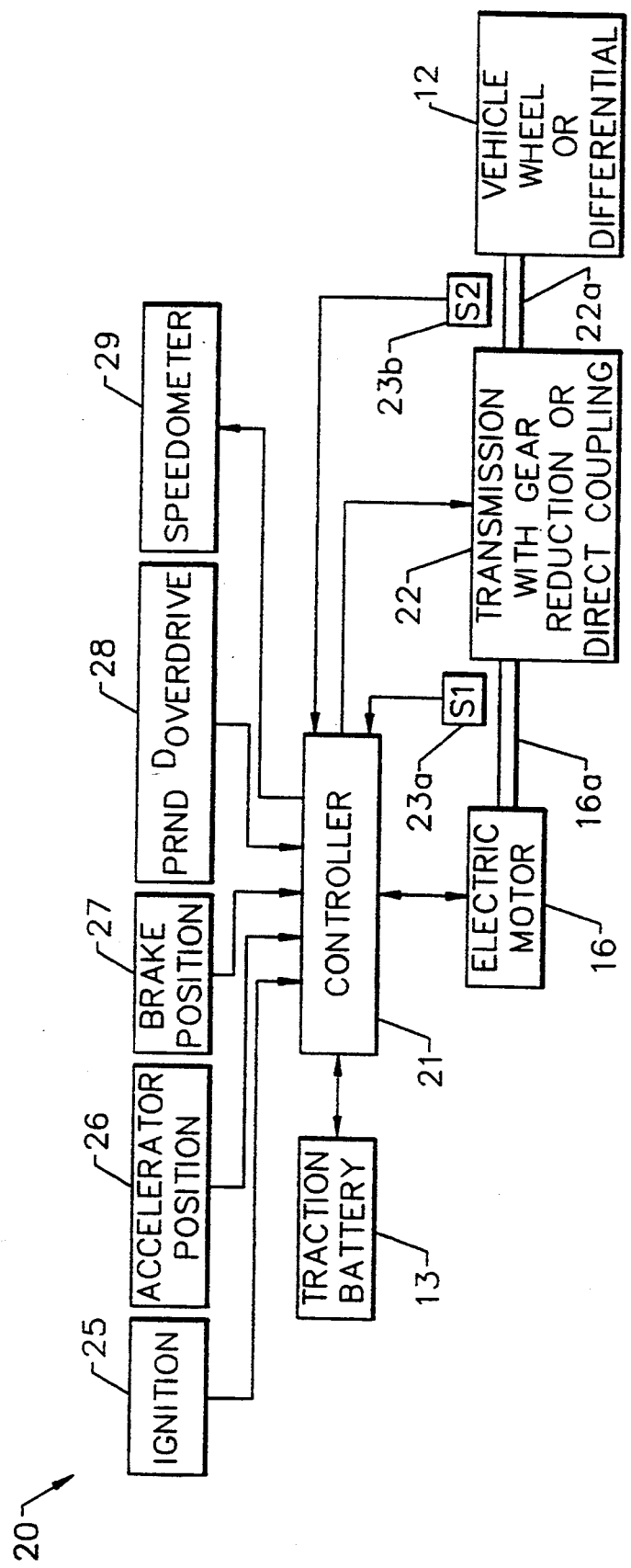
FIG. 2 is a schematic block diagram of a drive train for an electric vehicle according to the present invention.

Referring now to the schematic diagram of FIG. 2, the drive train 20 according to the invention is explained. The drive train components are controlled by control means, including the controller 21 as illustrated. The controller 21 preferably includes one or more microprocessors operating under stored program control. For example, the control means may be provided by the VCU 14 and/or the control computer associated with the DC-to-AC inverter (FIG. 1). As would be readily understood by those skilled in the art, the controller 21 may receive inputs from an "ignition" switch 25, an accelerator position transducer 26, a brake position transducer 27, and a gear selector 28 for operating the electric motor 16 for driving and braking the vehicle.

The controller 21 delivers power from the traction battery 13 to the electric motor 16 when operating the motor in a drive mode. The controller may also operate the motor 16 in a regenerative braking mode wherein the motor is operated as a generator to slow the vehicle, while simultaneously recharging the traction battery 13.

The electric motor 16 is connected to drive one or more of the vehicle wheels 12, directly or through a differential, by a transmission 22. The transmission 22 is operable in either a speed reduction mode or a direct coupled mode. The speed reduction mode produces higher torque as typically required when starting or accelerating the vehicle, while the direct coupled mode is for high-speed, low-load operation, such as highway cruising over fairly level terrain.

The electric motor 16 includes an output shaft 16a coupled to an input of the transmission The transmission 22, in turn, preferably includes an output shaft 22a coupled to one or more of the vehicle wheels 12. First and second rotational speed sensors 23a, 23b are preferably associated with respective shafts of the electric motor 16 and the transmission 22. The controller 21 also preferably cooperates with the rotational speed sensors 23a and 23b for operating the transmission 22 in either the speed reduction mode or the direct coupled mode. The controller 21 may also display the vehicle speed on a speedometer 29.

As would be readily understood by those skilled in the art, the sensing of the motor speed directly corresponds to sensing the vehicle speed taking into account the gear reduction ratio and the rolling circumference of the wheels when in the speed reduction mode. Thus, the controller 21 may operate the transmission 22 to change to the direct coupled mode when the vehicle speed is in the range of about 50 to 60 mph, which would correspond to a predetermined range of electric motor rotational speed.

The controller 21 preferably includes speed synchronizing means connected to the electric motor 16 for reducing the rotational speed of the motor to substantially match to a corresponding reduced rotational speed of an input to the transmission 22 in the direct coupled mode when changing from the speed reduction mode to the direct coupled mode. In other words, since the transmission input and output speeds are the same in the direct coupled mode, the electric motor speed is also matched to the output speed of the transmission in the direct coupled mode.

The term "substantially match" is meant to cover a range from the identical speed to a slight mismatch, such as to facilitate meshing of gears, for example, as would be readily appreciated by those skilled in the art. The controller 21 preferably includes means for operating the motor 16 in a regenerative braking mode to slow the motor to the desired speed. The speed of the motor 16 may be controlled very precisely and may be changed to a desired value within a relatively short period of time on the order of a half second or less. For a 10:1 gear reduction ratio, the motor speed must be slowed by a factor of 10. For example, if the motor were rotating at 10,000 RPM in the speed reduction mode, the motor would be slowed to about 1,000 RPM to engage the direct coupled mode.

The transmission 22 also preferably includes freewheeling means for decoupling the motor output shaft 16a from the output shaft 22a of the transmission 22. Decoupling means that the motor speed may be changed relative to the speed of the output of the transmission 22 as would be readily understood by those skilled in the art. The controller 21 preferably includes means cooperating with the freewheeling means to uncouple the motor 16 and transmission 22 momentarily to facilitate changing the motor speed when the transmission is changed between the speed reduction mode and the direct coupled mode. Accordingly, the drive train 20 with the speed synchronizing means cooperating with freewheeling means is smooth in operation when changing between the speed reduction mode and the direct coupled mode.

In addition, the speed synchronizing means may also include means for increasing the speed of the motor 16 to match to a corresponding increased speed of an input of the transmission 22 in the speed reduction mode when changing from the direct coupled mode to the speed reduction mode. The freewheeling means would also be activated during this change to provide smoother and more transparent operation to the vehicle occupants.

Another aspect of the drive train 20 according to the present invention is the ability of the driver of the vehicle 10 to manually select a desired mode of operation for the vehicle similar to the selection of drive or overdrive in a conventional gasoline-fueled vehicle. In other words, the drive train 20 preferably includes selector means, such as provided by a driver selector lever 28 similar to a conventional "PRNDD$_{overide}$" selector Accordingly, when the "D" position is selected, the controller 21 allows the transmission 22 to operate only in the speed reduction mode, or changes the transmission to operate in the speed reduction mode if not already in that mode, irrespective of motor speed. Thus, greater torque is available from the motor 16, such as for passing or mountainous terrain. When the "D$_{overide}$" position is selected, the controller 21 is permitted to shift between the speed reduction mode and the direct coupled mode as described above for higher operating efficiency and longer vehicle range. Thus, the drive train 20 of the present invention may closely mimic the operation of a conventional gasoline-fueled vehicle and thereby achieve greater driver acceptance.

Figure 3:
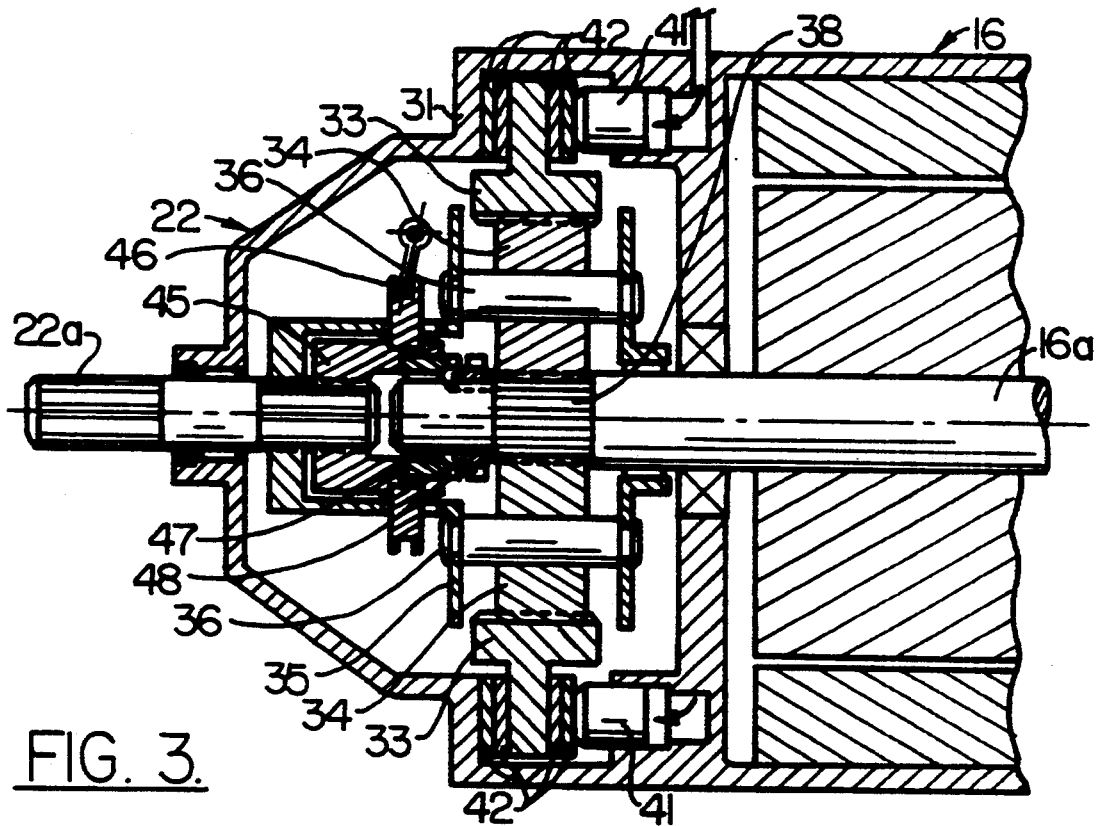
FIG. 3 is a side cross-sectional view of a portion of the electric motor and transmission of the present invention illustrating the transmission in the speed reduction mode.
Figure 4:
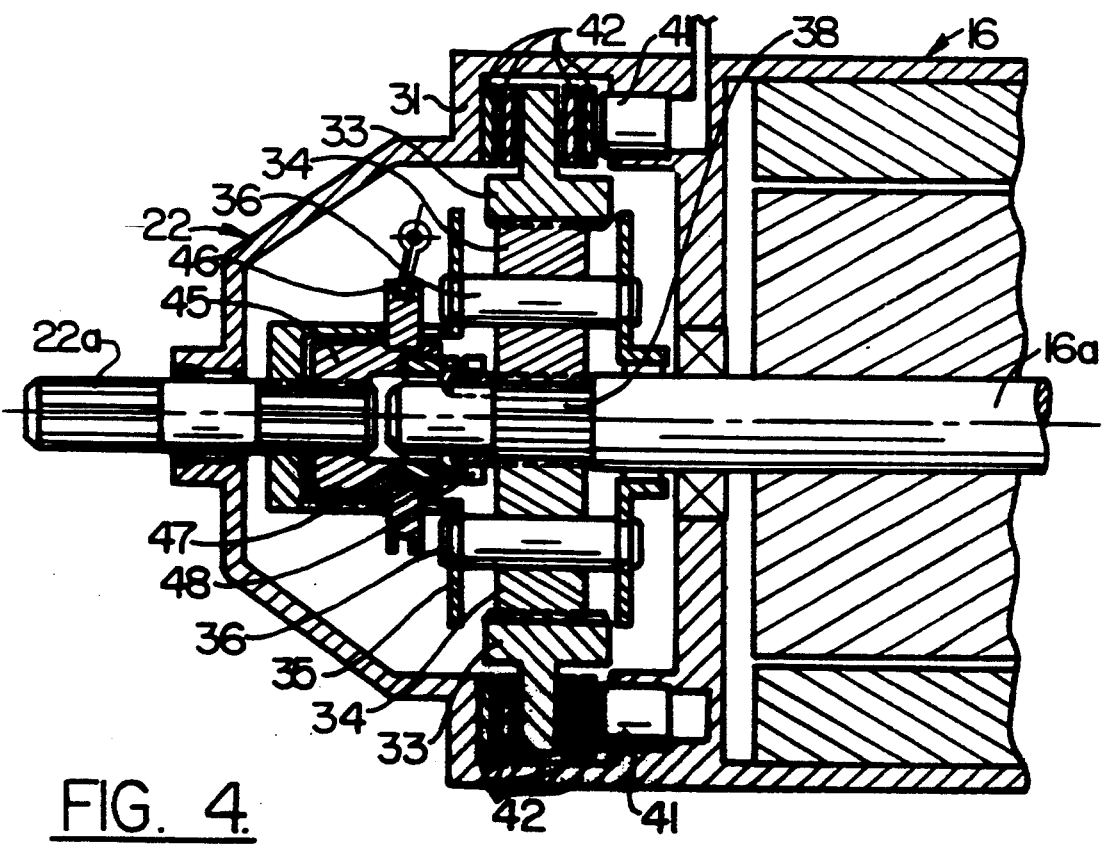
FIG. 4 is a side cross-sectional view of a portion of the electric motor and transmission of the present invention illustrating the transmission in a freewheeling state when being changed between a speed reduction mode and a direct coupled mode.
Figure 5:
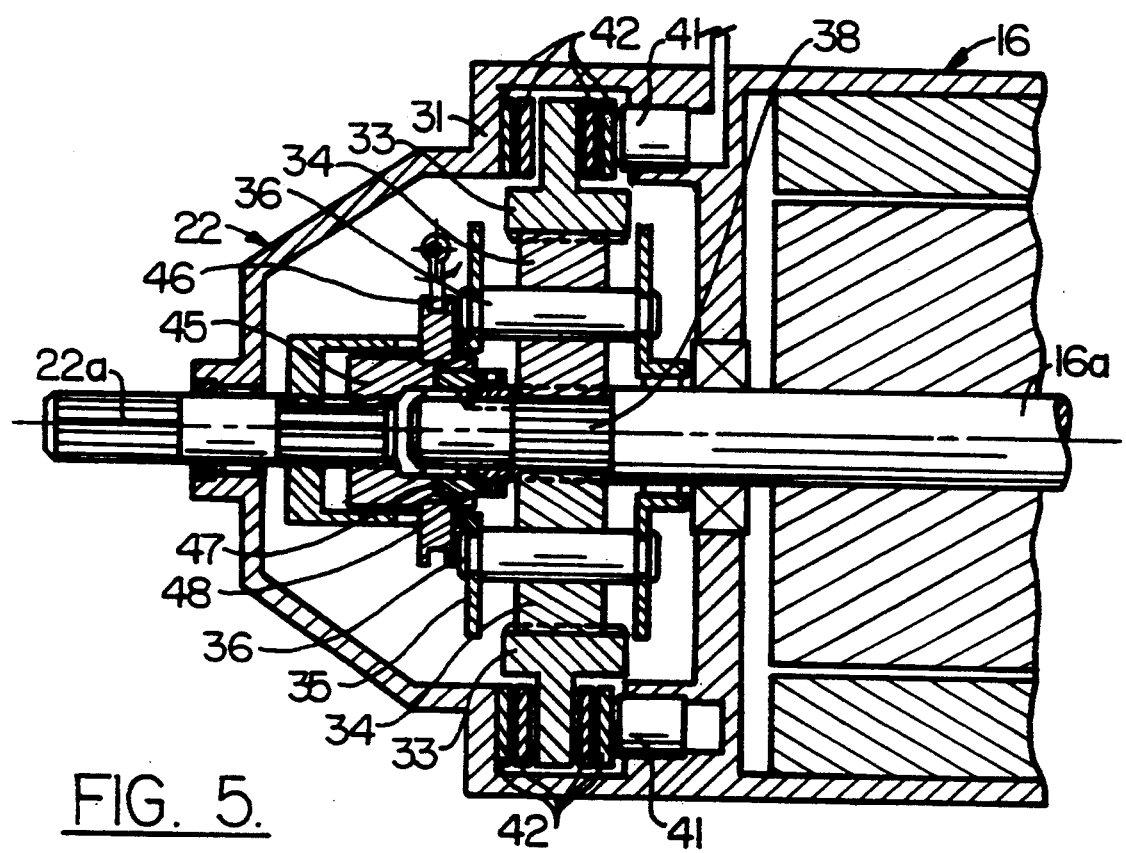
FIG. 5 is a side cross-sectional view of a portion of the electric motor and transmission of the present invention illustrating the transmission in a direct coupled mode.

Referring now to FIGS. 3-5, one preferred embodiment of a transmission 22 for use in the drive train according to the invention is explained. The transmission 22 is preferably provided by a single stage planetary gearbox as illustrated. More particularly, the planetary gearbox includes a housing 31, a releasably lockable ring gear 33 positioned within the housing, a series of planet gears 34 rotatably supported on a planetary carrier 35 by respective shafts 36, and a sun gear 38 integrally formed on the end portion of the electric motor output shaft 16a.

The gearbox also preferably includes one or more hydraulically movable pistons 41 cooperating with one or more friction plates 42 to releasably lock the ring gear 33 to the housing 31. FIG. 3 illustrates the planetary gearbox for operation in the speed reduction mode wherein the ring gear 34 is locked to the housing 31 and the rotation of the motor output shaft 16a is coupled by the sun gear 38, through the planet gears 34 and through the planetary carrier 36 to the transmission output shaft 22a. A reduction ratio in the range of about 5:1 to 15:1, and, more preferably about 10:1 is desirable for a typical induction motor.

FIG. 4 illustrates the hydraulically actuable pistons 41 in a retracted position so that the ring gear 33 is not locked by the friction plates 42 to the housing 31. Accordingly, the motor output shaft 16a is effectively decoupled from the gearbox output shaft 22a, as the ring gear 33 is free to rotate. Stated in other words, the hydraulically actuable pistons 41 cooperating with the ring gear 34 and friction plates 42 provide freewheeling means for the gearbox.

Now referring to FIG. 5, the transmission 22 provided by the planetary gearbox is illustrated in the direct coupled mode. The planetary gearbox also includes direct coupling means for directly coupling the motor output shaft 16a to the transmission output shaft 22a.

The direct coupling means is provided by a longitudinally slidable coupler 45 operable by a pivotable fork 46. The slidable coupler 45 includes longitudinally extending internal teeth cooperating with corresponding teeth on the transmission output shaft 22a to prevent relative rotation while permitting sliding movement of the coupler 45. In addition, the slidable coupler 45 includes teeth 47 on an end thereof for matingly engaging corresponding teeth 48 on the adjacent end of the motor output shaft 16a as shown in FIG. 5. Pivoting of the fork 46 causes the slidable coupler 45 to engage the motor output shaft 16a and directly drive the gearbox output shaft 22a. Accordingly, only slight windage losses are present in the direct coupled mode.

As would be readily understood by those skilled in the art, the controller 21 may include respective hydraulic and mechanical actuators, not shown, to operate the hydraulically movable pistons 41 and the pivoting fork 46 of the planetary gearbox. As would also be readily understood by those skilled in the art, transmission means according to the invention may be provided by other mechanical, hydraulic, and/or electrical components.

Figure 6:
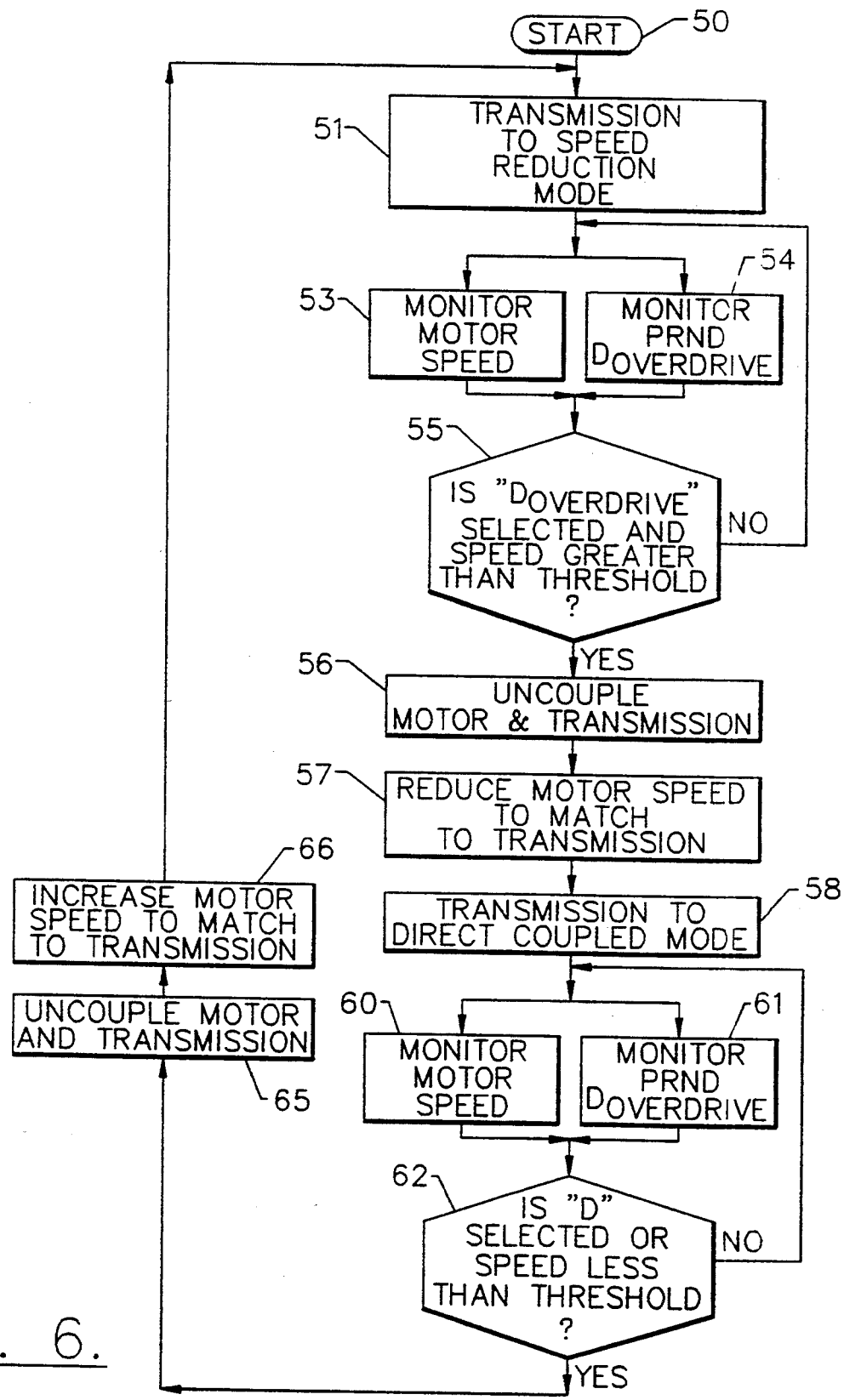
FIG. 6 is a flow chart block diagram illustrating the operation of the drive train according to the invention.

Referring now to FIG. 6, a block diagram further illustrating the operation of the drive train of the present invention is explained. The vehicle is initially started in Block 50 and the transmission is controlled to operate in the speed reduction mode (Block 51). The electric motor speed and the driver selection of "D" or "D$_{overdrive}$" is monitored as shown in Blocks 53 and 54, respectively. For ease of understanding, only the "D" and "D$_{overdrive}$" selections are further described, since those of skill in the art will appreciate the operation of "P" "R" and "N".

If the motor speed is above a predetermined value, for example corresponding to a vehicle speed of 50 mph, and the "D$_{overdrive}$" is selected, the controller operates the transmission to first uncouple or freewheel the transmission and motor (Block 56), the motor speed is reduced as by operating the motor in the regenerative braking mode (Block 57) and the transmission is changed to the direct coupled mode (Block 58).

The transmission will remain in the direct coupled mode unless the motor speed falls below a predetermined value or the driver selects the "D" position on the selector lever (Blocks 60, 61 and 62). The motor is then uncoupled from the transmission (Block 65), the speed is increased to match to a corresponding increased speed of the transmission in the speed reduction mode (Block 66), and the transmission is changed to operate in the speed reduction mode (Block 51).

The electric vehicle 10 incorporating the drive train 20 of the present invention enjoys increased efficiency at highway cruising speeds, for example, because the direct coupling bypasses the losses caused by speed reduction gearing in the transmission. In addition, the synchronization of the motor speed to the transmission prior to changing to the opposite mode of operation provides a smooth transition. The ability of the driver to prevent the transmission from operating in the direct coupled mode provides increased torque, as for passing or traveling hilly terrain, while closely mimicking the operation of a conventional gasoline-fueled vehicle.

Accordingly, many modifications and other embodiments of the invention will come to the mind of one skilled in the art having the benefit of the teachings presented in the foregoing descriptions and the associated drawings. Therefore, it is to be understood that the That which is claimed is:

1. A drive train for an electric vehicle, said drive train comprising:
   a traction battery;
   an electric motor associated with said traction battery and operable in one of a drive mode for driving one or more wheels of the vehicle and a regenerative braking mode for recharging said traction battery;
   sensing means connected to said electric motor for sensing rotational speed thereof;
   transmission means connected to said electric motor for rotatably driving one or more wheels of the vehicle in one of a speed reduction mode and a direct coupled mode; and
   control means connected to said traction battery, said electric motor, and said transmission means, and being responsive to said sensing means for operating said transmission means in said speed reduction mode when a rotational speed of said electric motor is below a first predetermined value and for operating said transmission means in said direct coupled mode when a rotational speed of said electric motor is above a second predetermined value, said control means comprising speed synchronizing means for operating said electric motor in said regenerative braking mode to reduce a rotational speed of said electric motor to a corresponding reduced rotational speed of said transmission means in said direct coupled mode when changing said transmission means from said speed reduction mode to said direct coupled mode.

2. A drive train according to claim 1 wherein said transmission means further comprises freewheeling means for decoupling said electric motor and said transmission means; and wherein said control means further comprises means cooperating with said freewheeling means for decoupling said electric motor and said transmission means while changing rotational speed of said electric motor to facilitate changing between said speed reduction mode and said direct coupled mode.

3. A drive train according to claim 2 wherein said speed synchronizing means comprises means for increasing rotational speed of said electric motor to substantially match to a corresponding increased rotational speed of said transmission means in said speed reduction mode when changing said transmission means from said direct coupled mode to said speed reduction mode.

4. A drive train according to claim 1 further comprising driver selector means connected to said control means and cooperating therewith for permitting a driver to select said transmission means to operate only in said speed reduction mode irrespective of a rotational speed of said motor.

5. A drive train according to claim 1 wherein said transmission means has a predetermined reduction ratio in the range of about 5:1 to 15:1 when in said speed reduction mode.

6. A drive train according to claim 1 wherein said transmission means comprises a single stage planetary gearbox.

7. A drive train according to claim 6 wherein said single stage planetary gearbox comprises a housing, a releasably lockable ring gear positioned within said housing, a plurality of planet gears and an associated planetary carrier positioned within said housing, and a sun gear cooperating with said planet gears; and wherein said sun gear is connected to said motor and said planetary carrier drives the one or more wheels of the vehicle when said transmission means is in said speed reduction mode.

8. A drive train according to claim 1 wherein said electric motor is an induction motor.

9. A drive train according to claim 1 further comprising sensing means associated with said transmission means for sensing a rotational output speed thereof.

10. A drive train for an electric vehicle, said drive train comprising:
    a traction battery;
    an electric motor having an output shaft and being associated with said traction battery and operable in one of a drive mode for driving one or more wheels of the vehicle and a regenerative braking mode for recharging said traction battery;
    a sensor associated with the output shaft of said electric motor for sensing a rotational speed thereof;
    transmission means connected to said electric motor and comprising an output shaft for rotatably driving one or more wheels of the vehicle, said transmission means further comprising a planetary gearbox having an input coupled to said output shaft of said electric motor for operating in a speed reduction mode, and direct coupling means for coupling said motor output shaft to said output shaft of said transmission means for operating in a direct coupled mode; and
    control means connected to said traction battery, said electric motor, and said transmission means, and being responsive to said sensor for operating said transmission means in said speed reduction mode when a rotational speed of said electric motor is below a first predetermined value and for operating said transmission means in said direct coupled mode when a rotational speed of said electric motor is above a second predetermined value,.., said control means comprising speed synchronizing means for operating said electric motor in said regenerative braking mode to reduce a rotational speed of said electric motor to a corresponding reduced rotational speed of said transmission means in said direct coupled mode when changing said transmission means from said speed reduction mode to said direct coupled mode.

11. A drive train according to claim 10 wherein said transmission means further comprises freewheeling means for decoupling said motor output shaft and said input of said transmission means; and wherein said control means further comprises means cooperating with said freewheeling means for uncoupling said electric motor output shaft and said output shaft of said transmission means while changing rotational speed of said electric motor to facilitate changing said transmission means between said speed reduction mode and said direct coupled mode, 12. A drive train according to claim 11 wherein said speed synchronizing means comprises means for increasing rotational speed of said electric motor output shaft to substantially match to a corresponding increased rotational speed of said input of said transmission means in said speed reduction mode when changing said transmission means from said direct coupled mode to said speed reduction mode.

13. A drive train according to claim 10 further comprising driver selector means connected to said control means and cooperating therewith for permitting a driver to select said transmission means to operate only in said speed reduction mode irrespective of a rotational speed of said electric motor.

14. A drive train according to claim 10 wherein said planetary gearbox has a predetermined reduction ratio in the range of about 5:1 to 15:1.

15. An electric vehicle comprising:
a frame;
one or more wheels rotatably mounted to said frame;
a traction battery carried by said frame;
an electric motor connected to said traction battery and operable in one of a drive mode for driving one or more wheels of the vehicle and the regenerative braking mode for recharging said traction battery;
sensing means associated with said electric motor for sensing rotational speed thereof;
transmission means connected to said electric motor for rotatably driving the one or more wheels of the vehicle in one of a speed reduction mode and a direct coupled mode; and
control means connected to said transmission means and responsive to said sensing means for controlling said transmission means to operate in said speed reduction mode when a rotational speed of said electric motor is below a first predetermined value and for controlling said transmission means to operate in said direct coupled mode when a rotational speed of said electric motor is above a second predetermined value, said control means comprising speed synchronizing means for operating said electric motor in said regenerative braking mode to reduce a rotational speed of said electric motor to a corresponding reduced rotational speed of said transmission means in said direct coupled mode when changing said transmission means from said speed reduction mode to said direct coupled mode.

16. An electric vehicle according to claim 15 wherein said transmission means further comprises freewheeling means for decoupling said electric motor and said transmission means; and wherein said control means further comprises means cooperating with said freewheeling means for decoupling said electric motor and said transmission means while changing rotational speed of said electric motor to facilitate changing between said speed reduction mode and said direct coupled mode.

17. An electric vehicle according to claim 16 wherein said speed synchronizing means further comprises means for increasing rotational speed of said motor to substantially match to a corresponding increased rotational speed of said transmission means in said speed reduction mode when changing said transmission means from said direct coupled mode to said speed reduction mode.

18. An electric vehicle according to claim 15 further comprising driver selector means connected to said control means and cooperating therewith for permitting a driver to select said transmission means to operate only in said speed reduction mode irrespective of a rotational speed of said motor.

19. A method for driving one or more wheels of an electric vehicle including a traction battery connected to an electric motor which is connected to the drive wheels through a transmission, the electric motor being operable in one of a drive mode for driving one or more of the drive wheels of the vehicle and a regenerative braking mode for recharging the traction battery, and the transmission being operable in either a speed reduction mode or a direct coupled mode, said method comprising the steps of:
sensing rotational speed of the electric motor;
operating the transmission in the speed reduction mode when a rotational speed of the electric motor is below a first predetermined value and operating the transmission in the direct coupled mode when a rotational speed of the electric motor is above a second predetermined value; and
substantially synchronizing rotational speed of the electric motor and the transmission when changing the transmission from the speed reduction mode to the direct coupled mode by operating the electric motor in the regenerative braking mode to reduce a rotational speed of the electric motor to substantially match to the transmission.

20. A method according to claim 19 further comprising the step of decoupling the electric motor and the transmission while changing rotational speed of the electric motor to match the transmission.

21. A method according to claim 19 further comprising the step of substantially synchronizing rotational speed of the electric motor and the transmission when changing the transmission from the direct coupled mode to the gear reduction mode by increasing a rotational speed of the electric motor to substantially match to the transmission.

22. A method according to claim 19 further comprising the step of operating the transmission only in the speed reduction mode irrespective of a rotational speed of the motor responsive to a driver selection of only the speed reduction mode.

* * * * *

UNITED STATES PATENT AND TRADEMARK OFFICE
CERTIFICATE OF CORRECTION

PATENT NO.   :   5,403,244
DATED        :   April 4, 1995
INVENTOR(S)  :   Tankersley et al.

It is certified that error appears in the above-identified patent and that said Letters Patent is hereby corrected as shown below:

Column 5, line 11, after "vehicle" insert --10.--.

Column 10, line 41, delete ",.,"

Signed and Sealed this

Twenty-sixth Day of December, 1995

Attest:

BRUCE LEHMAN

Attesting Officer    Commissioner of Patents and Trademarks